United States Patent

Stava

(10) Patent No.: US 6,172,333 B1
(45) Date of Patent: Jan. 9, 2001

(54) ELECTRIC WELDING APPARATUS AND METHOD

(75) Inventor: Elliott K. Stava, Sagamore Hills, OH (US)

(73) Assignee: Lincoln Global, Inc., Cleveland, OH (US)

(*) Notice: Under 35 U.S.C. 154(b), the term of this patent shall be extended for 0 days.

(21) Appl. No.: 09/376,401

(22) Filed: Aug. 18, 1999

(51) Int. Cl.[7] .................................................. B23K 9/09
(52) U.S. Cl. .................................. 219/137 PS; 219/130.1
(58) Field of Search ........................ 219/137 PS, 124.03, 219/125.11, 130.1, 136, 137 R

(56) References Cited

U.S. PATENT DOCUMENTS

| | | | |
|---|---|---|---|
| 2,938,107 | * 5/1960 | Pease | 219/124.03 |
| 3,342,973 | * 9/1967 | Smith et al. | 219/137 R |
| 3,627,978 | * 12/1971 | Endo et al. | 219/137 PS |
| 3,746,833 | * 7/1973 | Ujiie | 219/137 R |
| 4,246,463 | 1/1981 | Shutt et al. | |
| 4,806,735 | * 2/1989 | Ditschun et al. | 219/137 PS |
| 5,001,326 | 3/1991 | Stava. | |
| 5,155,330 | 10/1992 | Fratiello et al. | |
| 5,676,857 | 10/1997 | Parker. | |

OTHER PUBLICATIONS

Copy of drawings from U.S. Serial No. 08/936,883, filed on Sep. 25, 1997.
Copy of specification and drawings for U.S. Serial No. 09/336,804, filed Jun. 21, 1999.

* cited by examiner

*Primary Examiner*—Clifford C. Shaw
(74) *Attorney, Agent, or Firm*—Vickers, Daniels & Young

(57) ABSTRACT

An apparatus and method for welding the gap between two ends of adjacent first and second pipe sections comprising: moving a first consumable electrode along the end of the first pipe section; moving a second consumable electrode along the end of the second pipe section; moving the electrodes in unison in side by side relationship on opposite sides of the gap; applying a first welding current to the first electrode; and, applying a second welding current to the second electrode, separate from the first welding current and, optionally, a mechanism for adjusting the spacing of the electrodes.

24 Claims, 3 Drawing Sheets

ELECTRIC WELDING APPARATUS AND METHOD

The present invention relates to an electric arc welding apparatus and, more particularly, to a welding apparatus using two consumable electrodes and the method of welding with two consumable electrodes positioned in side-by-side relationship.

INCORPORATION BY REFERENCE

The present invention involves the use of two side-by-side consumable electrodes for welding the root pass defined by the gap between two spaced ends of pipe sections being welded together in the field. In pipe welding, the consumable electrode is moved toward the space between the pipe sections from a wire feeder while the torch carrying the electrode and introducing electrical current to the electrode moves around the pipe sections. This movement is accomplished by a mechanical arrangement often referred to as a "bug." Such torch moving mechanism used in the present invention is illustrated in Parker U.S. Pat. No. 5,676,857 wherein a single electrode is moved by a welding bug on a track supported adjacent the gap being welded. This patent is incorporated by reference herein showing the environment to which the present invention is directed, so that the bug and guide track used with the present invention need not be repeated. The invention involves the use of two consumable electrodes that are moved in unison for the purpose of laying the initial bead in the gap between the pipe sections. The use of two or more consumable electrodes is known in electric arc welding. Such tandem electrodes are operated in a front to back orientation and are shown in Shutt U.S. Pat No. 4,246,463 and Fratiello U.S. Pat No. 5,155,330. These patents are also incorporated by reference herein to show tandem electrodes driven by a single power supply, even though the electrodes are disposed from back to front so that a first bead is laid and then a second bead is laid over the first bead. Pipe welding using tandem consumable electrodes for laying a first bead in the open root joint followed by a second bead over the joint is the general subject matter of prior co-pending application Ser. No. 336,804 filed Jun. 21, 1999 by applicant. This prior co-pending application is not prior art; however, it does disclose the use of two separate power supplies for driving each of two separate consumable electrodes. These electrodes are in separate, spaced torches that are isolated from each other. Each electrode is driven by a separate power supply, such as an STT welder manufactured by The Lincoln Electric Company of Cleveland, Ohio. An STT welder is disclosed in Stava U.S. Pat. No. 5,001,326, incorporated by reference herein. Since the present invention relates to the use of two separate power supplies, preferably two separate STT welders, the disclosure of prior application Ser. No. 336,804 filed Jun. 21, 1999 is also incorporated herein by reference so that the separate power supplies contemplated for use by the present invention need not be repeated herein.

BACKGROUND

When forming a pipe line in the field, two sections of pipe are brought together defining a circular joint which is welded by an appropriate arc welder. When performing this pipe welding procedure, the ends of the pipe sections are normally chamfered and brought together until the pipe sections abut each other. To create a high strength, quality weld between the pipe sections, one section is then moved away from the other section a slight amount to define an open root or gap, which is filled by the initial pass around the cylindrical joint. After the initial open root pass has filled the space between the ends of the sections, the welding operation continues by laying a succession of molten metal beads on top of the previously created weld bead. This procedure is repeated until the outwardly tapering joint between the pipe sections is filled. A critical operation in the pipe welding procedure is welding the initial open root pass. Welding the open root presents substantial variables. The welding procedure must form a bead between the pipe sections and the bead must penetrate through the pipe to fill the open root. However, molten metal can not protrude into the interior of the pipe through the gap. Consequently, there is substantial development work in the type of power supplies and the consumable electrode configurations to control heat of the open root pass to, thereby, create a quality open root joint. This bead must be laid rapidly and consistently in the field. Rapid open root welding of pipe sections is now done using a short circuit welder, such as the STT welder manufactured by The Lincoln Electric Company of Cleveland, Ohio. A single STT power supply and a single wire feeder directs the consumable electrode toward the gap between the pipe sections as the torch carrying the electrode is moved or guided around the pipe joint by a mechanism, as shown in Parker U.S. Pat. No. 5,676,857. Using an STT arc welder and the mechanical bug and track shown in the Parker patent, formulates a root pass bead of exceptional quality. The consumable electrode is centered above the weld puddle bridging the open gap between the pipe sections as the open root bead is being formed. Centering of the electrode in this pipe welding procedure is important so that the molten metal from the consumable electrode is properly fused in the gap between the two spaced ends of the adjacent pipe sections. Since the welding arc is concentrated in the weld puddle, the bug traveling around the pipe and carrying the torch supporting the electrode must travel at a relatively slow speed. If the bug moves the electrode too rapidly as it is attempting to lay a bead in the open root, the electrode moves faster than formation of the puddle causing a blow through of the electric arc. Thus, the speed of the welding operation using the STT welder and a standard mechanical device for moving the electrode around the open root is limited by the physics of the surface tension forces. The speed at which the weld puddle is formed by the molten metal of the electrode limits the travel speed of the torch. This same limitation on the speed of the welding process exists when the welding process is modified to provide tandem electrodes, as shown in Fratiello U.S. Pat. No. 5,155,330. Since the electrodes are tandem back to front, the molten metal bead is formed at a speed determined by the surface tension forces interacting at the front consumable electrode. However, the tandem consumable electrode concept which has not yet been fully adopted for pipe welding is an advance in the art. By using tandem electrodes, the second, or following, electrode deposits additional material on top of the initial root pass of the first electrode to provide an increased deposition rate. Such tandem electrode welding does increase the amount of metal being deposited during the initial pass around the pipe sections; however, it presents substantial difficulties with respect to interference between the two adjacent welding processes. Prior application Ser. No. 336,804 filed Mar. 21, 1999 is directed to use of two tandem consumable electrodes with separate power supplies that are individually adjusted to prevent interference between the welding processes. This procedure has advantages and is not prior art to the present invention; however, it presents a limitation on the speed at which the open root pass bead can be laid. The initial bead is created by the front tandem electrode that is centered between the edges of the pipe section and can not move along the gap at a speed greater than the advancing molten metal puddle. These limitations exist in the rapidly advancing development work regarding use of STT welders for welding the ends of pipe sections in the field.

THE INVENTION

The present invention further improves a pipe welding operation implemented by an electric arc welding process utilizing an STT welder. When the electrode is centered in the gap, the torch can move along the gap at a speed controlled by the surface tension transfer of metal to the molten metal puddle being formed during the welding process. This is a speed limitation, as explained above, experienced even when a higher deposition rate is obtained by the use of two or more tandem electrodes. In accordance with the present invention, two consumable electrodes are directed to the puddle from a single torch. However, the electrodes are not oriented in a tandem relationship. They are closely spaced and located on opposite sides of the gap defining the open root. By this close spacing and orientation, welding speed in the open root pass is increased when using the superior STT technology. The two electrodes form a common puddle from opposite sides. It has been suggested that side-by-side consumable electrodes could be used for pipe welding; however, this arrangement could not use STT technology or other short circuit welding because, in short circuit welding, the arc current must be changed rapidly upon the impending formation of a fuse from an electric pinching of the molten metal. The fuse disconnects the molten metal ball from the electrode and shifts the power supply from a short circuit portion to a plasma arc portion. Side-by-side electrodes were thus impractical when using STT technology. Since an STT welder controls the heat in a manner allowing superior open root pass welding in pipe welding, side-by-side electrodes were not practical for pipe welding.

The present invention solves disadvantages experienced when using side-by-side electrodes and still allows STT technology to be used. In accordance with the invention, each of the electrodes has its own STT welder to control the short circuit welding process of each consumable electrode, independent of the other. Thus, each electrode is independently operated in the short circuit welding mode dictated by an STT welder, or by another welding power supply without the draw backs caused by use of two consumable electrodes. Each system driving one of the consumable electrode consists of an STT power source and a wire feeder. The two welding wires, or electrodes, are fed through a specially constructed torch for guiding the two advancing electrodes in side-by-side relationship toward the pipe sections at intersecting points on opposite sides of the open root. The electrodes are electrically insulated from each other in the torch so the only electrical connection between the electrodes occurs when both electrodes are in contact with the welding puddle. By electrically insulating the two consumable electrodes from each other, STT technology is applied to both electrodes to reduce weld spatter without one electrode affecting the tension transfer procedure of the other electrode. By properly measuring the dv/dt of each consumable electrode independent of the other, the impending fuse or explosion in the short circuit welding operation is detected. The reduction of current at each fuse is an independent adjustment of STT power supply for each electrode.

In the past, attempts to drive two side-by-side electrodes with an STT welder or with any other power supply, has resulted in both electrodes being connected electrically in the torch. Consequently, proper spatter reduction is nearly impossible and the advantage of STT technology is not realized. Thus, all efforts to use side-by-side consumable electrodes in the formation of the initial open root pass of a pipe welding procedure have been unsuccessful. There was no reduction in the spatter because the exact necking or electrical pinch off time for each electrode was not identical. One consumable electrode would pinch off, while the other electrode was still short circuited. This increased spatter. Side-by-side arrangement of electrodes, which has the advantage of increasing the speed of the deposition without actually moving faster than the advancing puddle, could not be used until the present invention.

In accordance with the invention, two consumable electrodes are positioned on the adjacent sidewalls of the plates near the open root gap so that the travel speed of the pipe welding mechanism is not limited by the physical factors limiting the travel speed in the single electrode system. By using the present invention, the current for each welding arc is adjusted for proper penetration and fusion into the land and root of each pipe section or plate being welded. The side-by-side consumable electrodes are spaced so that each electric arc is impinging on the same common welding puddle. Surface tension forces will assimilate the molten metal from the two side-by-side consumable electrodes to join the molten metal, thus, forming a single weld puddle. Consequently, the metal from two electrodes is introduced into the molten metal puddle from the sides of the gap as opposed to a single electrode melting in the center of the gap as done in the prior single electrode system. Consequently, the puddle accepts substantially increased molten metal and the speed of depositing metal is increased. Since the welding arcs are impinging on a solid metal surface, the resulting jet forces do not blow through into the interior of the pipe, irrespective of the speed that the mechanical bug moves along the gap. Consequently, higher welding currents and faster travel speeds are made possible by the use of the present invention.

It has been postulated that side-by-side electrodes would have advantages over tandem electrodes; however, side-by-side electrodes or tandem electrodes driven by a single STT welder negates the advantages of the STT welder. Indeed, any electric arc welder operated in a short circuit mode or otherwise would have difficulty controlling side-by-side consumable electrodes where the two electrodes have different electrical and physical characteristics. Such electrodes can not be matched to avoid experiencing unbalance. A prior disclosure of side-by-side electrodes is illustrated in prior application Ser. No. 936,883 filed Sep. 25, 1997, which uses side-by-side electrodes with a single STT power supply which is inoperative for accomplishing the advantages of the STT welder. Such welding procedure has proven unsuccessful in the pipe welding industry.

In accordance with the present invention, there is provided an electric welding apparatus comprising first consumable electrode and a second consumable electrode movable mechanically in unison along a welding path in a movement direction defined by the gap between the edges of two adjacent, mutually grounded, first and second plates. In practice, the plates are really the spaced ends of two adjacent pipe sections. The plates or pipe sections have tapered adjacent edges defining an open root or gap between the plates or pipe sections. A first power supply for passing a first welding current between the first electrode and the first plate is combined with a second power supply for passing a second welding current between the second electrode and the second plate. The invention utilizes a torch for directing the electrodes toward the plates from individual wire feeders so that the electrodes are spaced from each other in a direction transverse to the movement direction of the welding operation. An insulator structure in the torch electrically isolates the electrodes as they are moved toward the plate and melted to form a molten metal puddle in the gap between the plates.

In accordance with the preferred embodiment of the present invention, the separate welding power supplies for the individual, electrically insulated consumable electrodes is an STT welder that develops a short circuit welding operation wherein there is a succession of welding cycles. Each cycle has a short circuit portion and a plasma arc portion, with the plasma arc portion including, in sequence, a plasma boost segment, a tailout segment and a background current segment. Of course, the invention contemplates the use of other separate and distinct power supplies, each creating its own welding process for the spaced, side-by-side consumable electrodes movable in unison along the open root between the pipe sections. In accordance with another aspect of the invention, the side-by-side consumable electrodes are adjusted in the lateral or transverse direction to move the two electrodes toward and away from the gap. The spaced electrodes are in the desired position during each welding operation. Indeed, it is possible to sense the width of the gap and change the transverse or lateral spacing of the electrode based upon this measurement; however, such adjustment is not necessary for the implementation of the present invention.

In accordance with another aspect of the present invention, there is provided a method of welding the gap between two ends of an adjacent first and second pipe sections. The method comprises moving a first consumable electrode along the end of the first pipe section, moving a second consumable electrode along the end of the second pipe section, moving the electrodes in unison in side-by-side relationship on opposite sides of the open root gap, applying a first welding current to the first electrode and applying a second welding current to the second electrode, the second current being different from the first welding current. In this manner, each of the electrodes is separately melted by the desired welding current and the molten metal formed on the end of the electrodes is combined by surface tension to create a molten metal bead joining the ends of the pipe sections.

The primary object of the present invention is the provision of an electric welding apparatus and method, which apparatus and method utilizes side-by-side consumable electrodes in a manner so they can be melted by using separate and distinct welding power supplies.

Another object of the present invention is the provision of an apparatus and method, as defined above, which apparatus and method uses separate and distinct power supplies and welding processes for each of the two consumable electrodes while the consumable electrodes are moved in unison along the open root.

Still a further object of the present invention is the provision of an apparatus and method, as defined above, which apparatus and method uses side-by-side electrodes without the disadvantages of forcing one electrode to be driven and melted by a physical or electrical condition of the other electrode.

Yet another object of the present invention is the provision of an apparatus and method, as defined above, which apparatus and method permits the use of STT technology to obtain proper reduction in weld spatter, while using side-by-side consumable electrodes.

A further object of the present invention is the provision of an apparatus and method, as defined above, which apparatus and method allows rapid deposition of molten metal in the open root of a pipe welding procedure without the tendency for blowthroughs.

These and other objects and advantages will become apparent from the following description taken together with the accompanying drawings.

PREFERRED EMBODIMENT OF THE INVENTION

Figure 2:
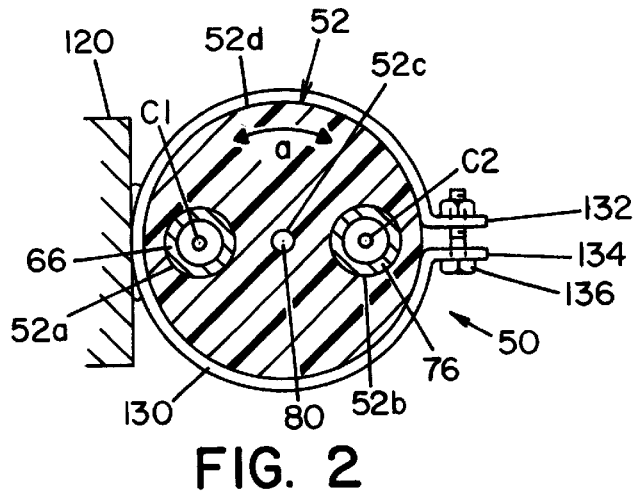
FIG. 2 is a cross-sectional view taken generally along lone 2—2 of FIG. 1.
Figure 1:
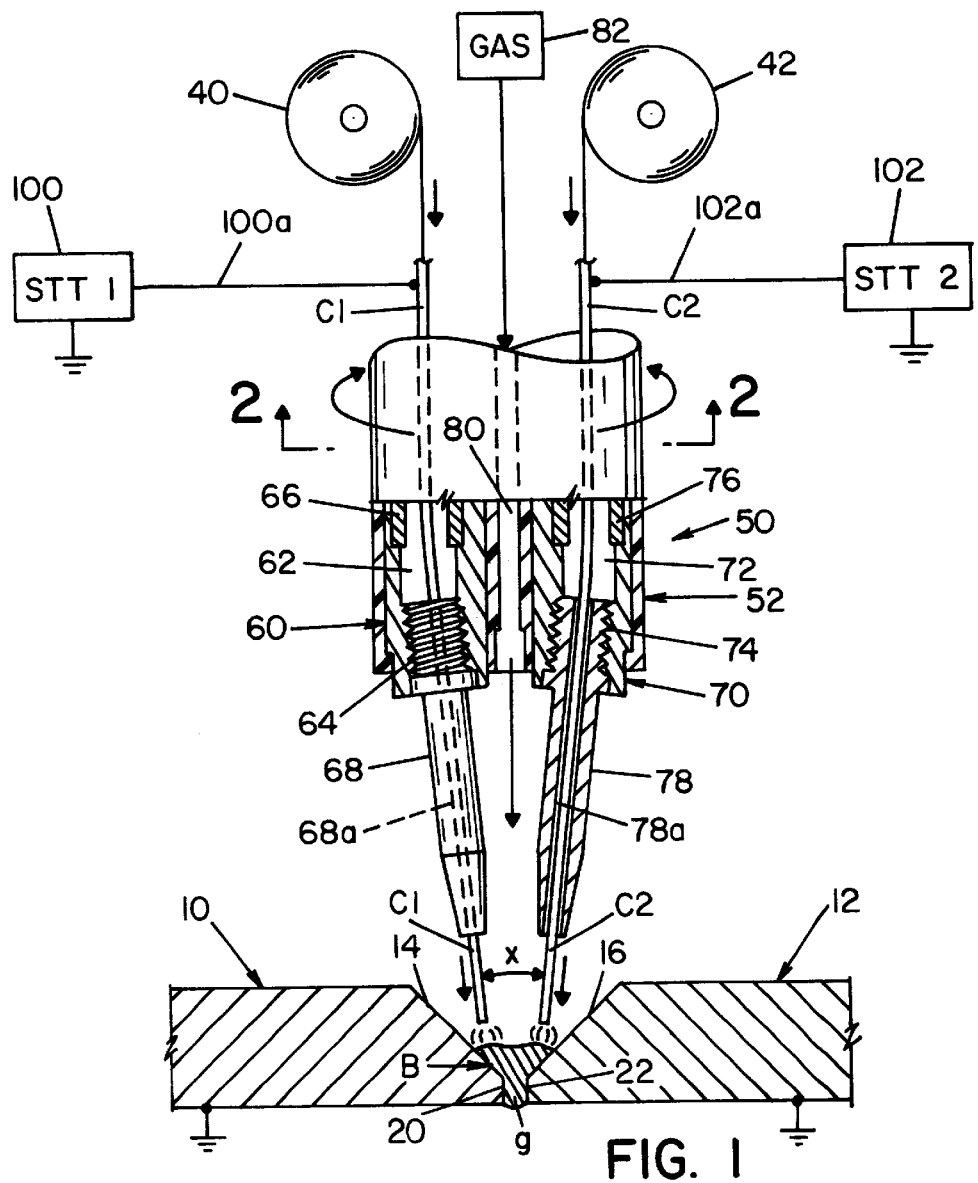
FIG. 1 is a partial side elevational view of a torch used in practicing the preferred embodiment of the invention with a partially cross-sectioned area and with a block diagram of components associated with the torch.
Figure 3:
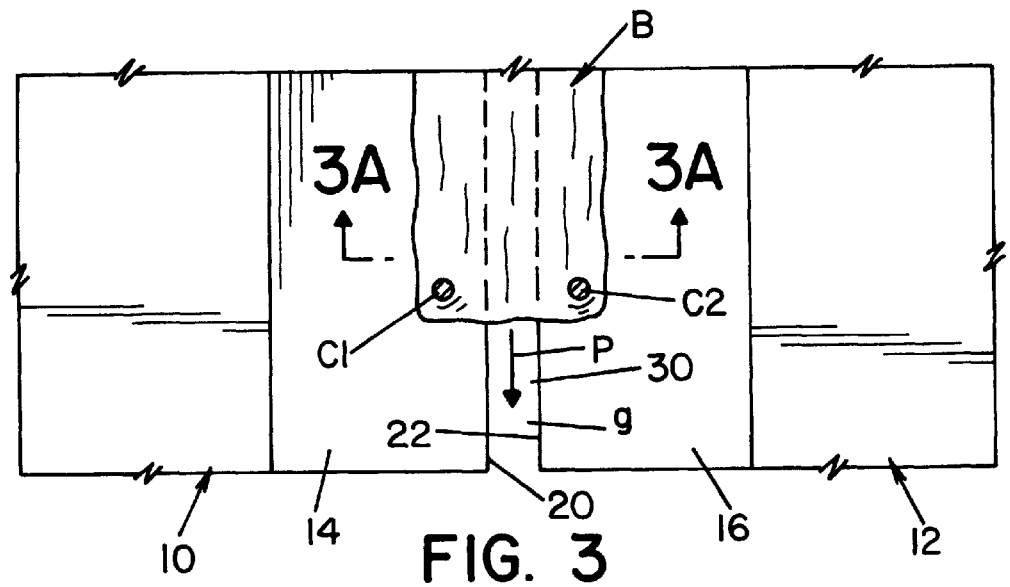
FIG. 3 is a top plan view of an open root welding operation using the present invention.

Referring now to FIGS. 1–3, steel plates 10, 12 which, in practice, are the cylindrical ends of two adjacent pipe sections that have been brought together and, then, retracted to produce a small spacing or gap g. Plates 10, 12 are formed from diverging sidewalls 12, 16 and facing edges or ends 20, 22, respectively, to define an open root joint 30. This joint is fairly narrow at gap g and opens outwardly toward the top of plates 10, 12. Open root joint 30 extends in a path P, best shown in FIG. 3, which path in a pipe welding installation is cylindrical about the central axis of the pipe sections. During use of the present invention, a molten metal puddle B is formed by melting consumable electrodes, or welding wires, C1, C2. These wires are melted and by surface tension action form into the molten metal puddle at a controlled temperature allowing the molten metal to extend through gap g between edges or ends 20, 22. Puddle B solidifies to join the pipe sections together in accordance with standard welding technology. The use of two separate consumable electrodes is known but not used in pipe welding in the field. In the illustrated preferred embodiment, consumable electrodes C1, C2 are provided with independent wire feeders schematically represented as spools or reels 40, 42. Wires C1, C2 are generally less than 0.100 inches in diameter and are supplied to the pipe welding operation on reels or from large drums containing several hundred pounds of welding wire. These welding wires are fed by wire feeders represented as reels 40, 42 toward plates 10, 12 to form molten metal puddles B. For the purpose of guiding consumable electrodes C1, C2 toward walls 14, 16 of plates 10,12, there is provided a schematically represented torch 50. In accordance with practice, torch 50 is mechanically moved along path P by a mechanical device 120, referred to as a "bug" which rides along a rail or guide track secured to the outer cylindrical surface of one of the pipe sections. In practice, the pipe sections are moved together and then withdrawn to form gap g. Before this procedure is accomplished, a cylindrical track is placed around the fixed pipe section. After the sections are in place the track guides torch 50 in a circle between the fixed section and the next pipe section to be welded to form the pipeline. Such procedure is standard in pipe welding in the field.

In the past a single consumable electrode was moved around gap g. The electrode was melted to form a molten metal puddle. This puddle passed through gap g and bridged the gap to weld together edges 14, 16. To increase the deposition rate, it has been suggested that a second electrode carried with the first electrode in a rearward tandem position could deposit a second molten metal puddle over the first puddle after the first puddle had frozen. These tandem electrodes each deposited its own molten metal into its own molten metal puddle. When doing this tandem concept, the disadvantage of a single electrode is retained. The electrode must be driven by the bug at a rate sufficiently slow to permit the advancing molten metal puddle to keep up with the electrode being melted. The present invention relates to a completely different concept for using two consumable electrodes C1, C2.

In accordance with the present invention, consumable electrodes or welding wires C1, C2 are positioned in side-by-side relationship on opposite sides of gap g so that they can be moved in unison along path P at a position generally above diverging sidewalls 14, 16 and outboard of edges 20, 22. To accomplish this positioning of the electrodes, torch 50 is formed from a generally cylindrical insulated body 52 having axially extending holes 52a, 52b and 52c and outer cylindrical surface 52d. Electrodes C1, C2 pass through holes 52a, 52b, respectively. Referring now to hole 52a, it is defined by and receives axially extending copper tubing 60 having a central welding wire passageway, or bore, 62 and a terminal, internally threaded end 64. An internal bearing sleeve or tubing 66 reduces the friction forces caused by pushing wire C1 through passage 62 toward plate 10, as best shown in FIG. 1. Threadably mounted on end 64 is a wire guide 68 having an internal guide bore 68a, which bore has a diameter just only slightly larger than the diameter of wire C1 to guide the wire at an angle toward molten metal puddle B. The wire intersects diverging sidewall 14 of plate 10. In a like manner, hole 52b is defined by an axially extending copper tubing 70 having an internal welding wire passageway, or bore, 72 and a terminal, internally threaded end 74. Bearing sleeve or tubing 76 reduces the friction of electrode C2 pushed through bore 72 toward lower angular disposed wire guide 78. The guide has an opening or bore 78a for directing welding wire C2 toward plate 12 at a distance angle. Electrodes C1, C2 are generally the same diameter and are moved toward the plates at an angle of between 10°–20°, but generally less than about 20°. However, the electrodes could be generally parallel. Body 52 includes a center opening or bore 52c, which includes gas passage tubing 80 for directing a shielding gas from supply 82 to the welding operation at the end of torch 50. In accordance with the invention, electrodes or welding wires C1, C2 are electrically isolated from each other and receive a welding current from a separate and distinct power supply.

In the preferred embodiment, power supplies 100, 102 are connected to electrodes C1, C2, respectively, by leads 100a, 102a. The power supplies are STT welders sold by The Lincoln Electric Company of Cleveland, Ohio. These welders are well known and are used for pipe welding in the field. Each independent welder directs a separate and distinct short circuit welding current to one of the consumable electrodes positioned in side-by-side relationship as shown in FIGS. 1–4. In accordance with the preferred embodiment, the welding currents perform a short circuit welding operation by creating a succession of welding cycles, each having a short circuit portion and a plasma arc portion. The plasma arc portion including, in sequence, a plasma boost segment, a tailout segment and a background segment. This type of short circuit welding current is the wave form created by an STT welder which is schematically illustrated by the current graphs shown in FIG. 6. By using torch 50, having an insulated body 52, each of the electrodes performs separate and distinct short circuit welding operations for melting the consumable electrodes and depositing the molten metal into a common molten metal puddle B. Although a short circuit welding current for each of the electrodes is preferred and, more specifically, an STT type of welding current is preferred, it is possible to use separate and distinct welding currents of different wave forms. Thus, separate and distinct power supplies 100, 102 could be short circuit welders, pulse welders or other types of electric arc welders. In addition, welder 100 need not be the same as welder 102. The welders are not used together. Consequently, welder 100 in practice is and could be an STT welder, while welder 102 could be a pulse welder. In the preferred embodiment, and in practice, both of the welders are STT welders having welding currents as shown in FIG. 6.

Figure 3A:
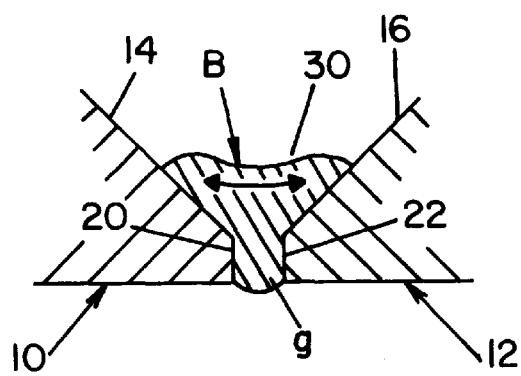
FIG. 3A is a partial cross-sectional view taken generally along line 3A—3A of FIG. 3.
Figure 4:
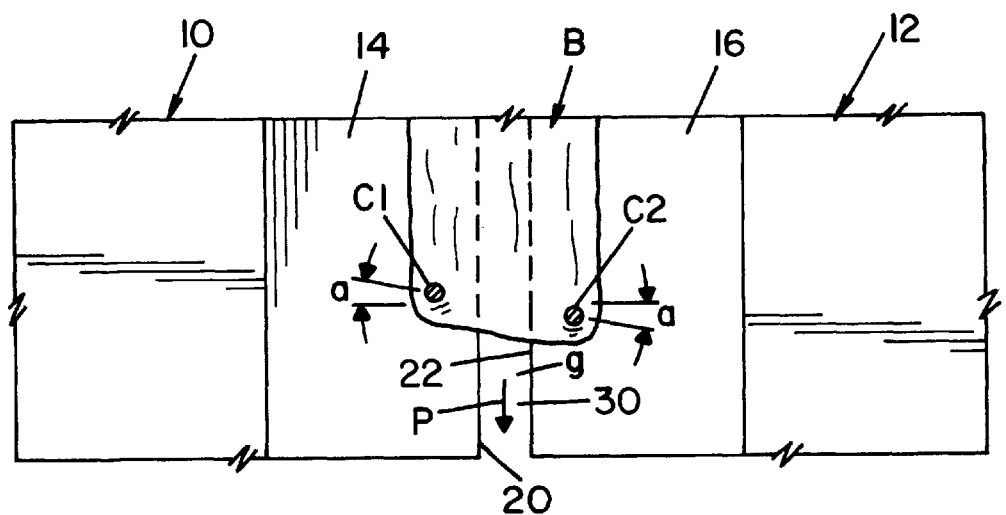
FIG. 4 is a top plan view similar to FIG. 3 showing adjustment of the consumable electrodes to change the lateral spacing as done in practicing the preferred embodiment of the present invention.

As the two consumable electrodes move along open root joint 30 to intersect the sidewalls on opposite sides of gap g, the wires or electrodes are melted as illustrated in FIG. 3A. The arrow indicates that surface tension between the molten metal from each of the electrodes joins the metal together to form a single puddle B. This puddle extends through gap g and generally melts the ends or edges 20, 22 to join plates 10, 12 during the open first root pass. In this manner, a large volume of molten metal is deposited from the two electrodes. They are not tandem front and back. Since puddle B is formed from the sides, and electrodes C1, C2 are not above gap g, there is no tendency for the arc to blowthrough the gap. This prevents blowthrough and substantial increases the amount of metal deposited. The speed of deposition and movement of the electrodes along path P is faster than when using a centered, single electrode. A variety of open root joints are to be welded by the present invention. Consequently, the electrodes C1, C2 are adjustable transversely with respect to gap g. If the gap is smaller, the electrodes are moved closer together. If the gap is larger, the electrodes are to be moved apart. This can be done by a variety of mechanisms; however, as illustrated in FIGS. 2 and 4, cylindrical surface 52d of body 52 allows torch 50 to be mounted on movable welding bug 120. Clamp 130 is a band with spaced ends 132, 134 which ends are joined together by bolt 136. With this mechanism, the lateral or transverse spacing of electrodes C1, C2 is adjusted by releasing clamp 130 and rotating torch 50 as indicated by arrows or angle a in FIGS. 2 and 4. A slight rotation of torch 50 about a vertical axis changes the spacing of the electrodes in a transverse direction. It is preferable to use a mechanism for adjusting the electrodes transversely without also introducing a component of front to back movement. However, this slight back to front movement, as shown in FIG. 4, is not sufficient to drastically change the configuration and physical make up of molten metal puddle B. One side of the puddle is little advanced from the other side of the puddle.

However, the puddle still joins together by surface tension and the electrodes still ride along the upper surface of diverging sidewalls 14, 16 to prevent blowthrough even when the electrodes move faster than the advancing puddle B. Thus, the simplicity of the rotational adjustment is employed.

Figure 5:
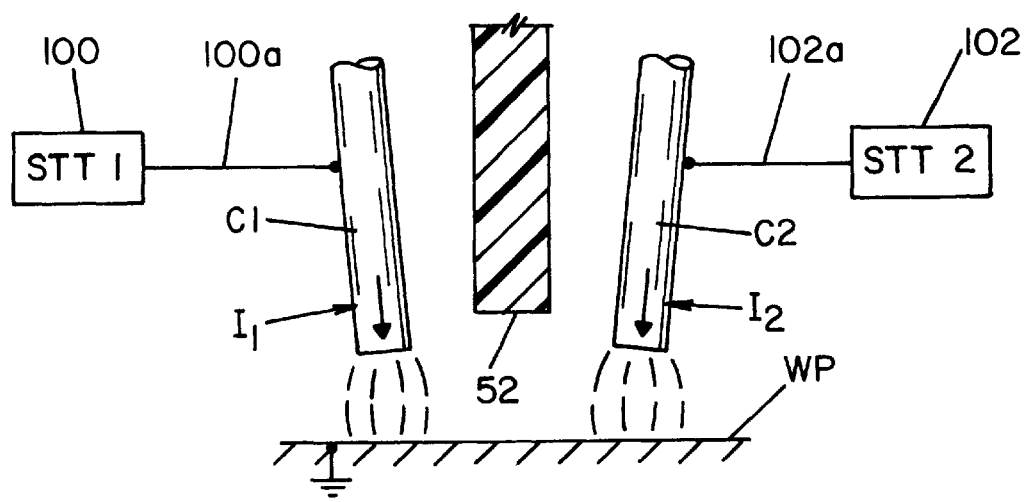
FIG. 5 is an enlarged view of two consumable electrodes as used in the present invention, with schematically illustrated components used in practicing the invention; and, FIG. 6 is a graph showing the first and second welding currents used with the first and second consumable electrodes.
Figure 6:
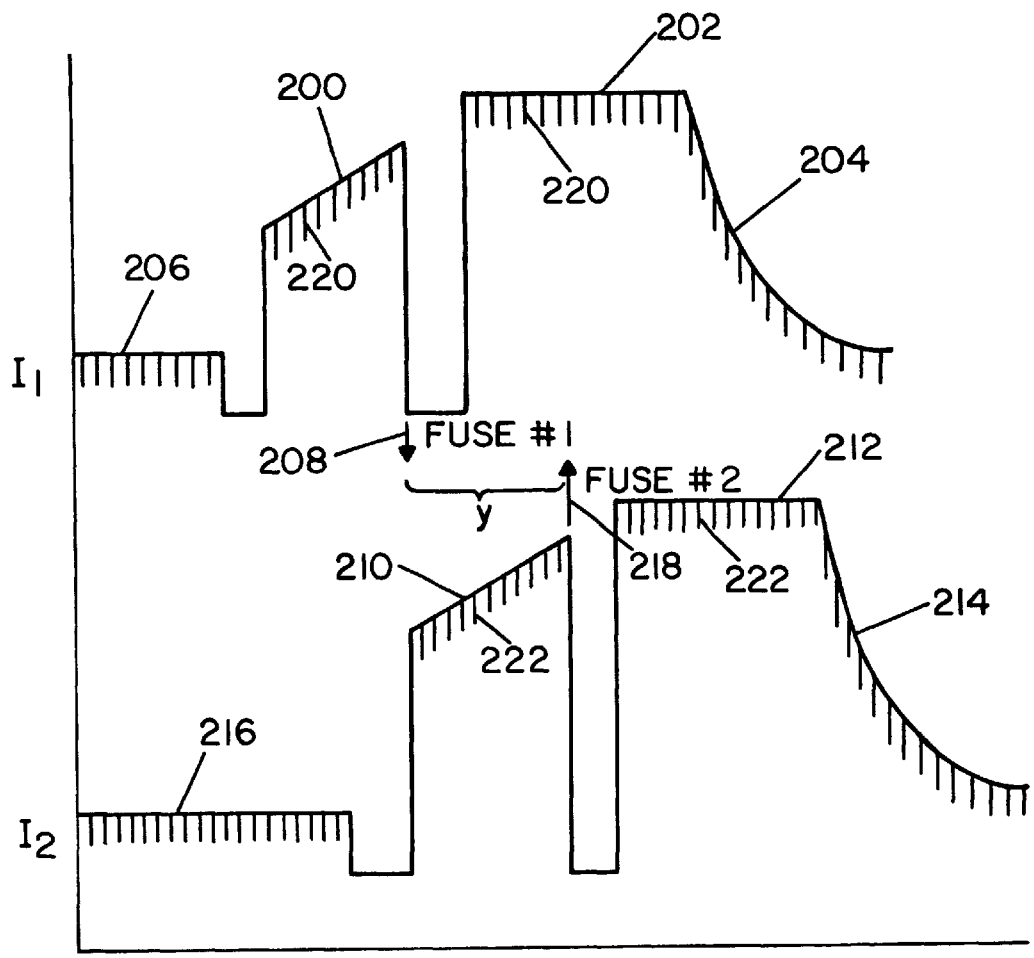

Referring now to FIGS. 5 and 6, in the preferred embodiment, two STT welders 100, 102 are used. Torch body 52 provides insulation between electrodes C1, C2, which electrodes are provided with welding currents $I_1$, $I_2$. These currents are schematically illustrated in FIG. 6. Current $I_1$ is the welding current for electrode C1. In a like manner, current $I_2$ is the welding current for electrode C2. Current $I_1$ has an STT wave form, as shown in FIG. 6, which comprises a short circuit portion 200 and a plasma arc portion including, in sequence, a plasma boost pulse or segment 202, a tailout segment 204 and a background current segment 206. The fuse 208 occurs when the short circuit is broken. In a like manner, the STT wave form for current $I_2$ includes a short circuit portion 210 with a plasma arc portion including, in sequence, plasma boost pulse or segment 212, tailout segment 214 and background current segment 216. The fuse 218 is offset a distance y from fuse 208. In accordance with the invention, the two welding wave forms are separate and distinct and are controlled by the individual welding operation being performed with respect to the separate consumable electrodes. Consequently, STT wave form of current $I_2$ can be offset from the wave form of current $I_2$ as indicated by the spacing y between fuse 208 and fuse 218. This spacing y is an offset which is made possible by maintaining the welding currents separate and distinct. An attempt to maintain the two consumable electrodes perfectly matched so a single STT welder could drive both electrodes in unison, is impractical. The present invention contemplates no electrical contact between the electrodes except at puddle B. This concept does not drastically interfere with the individual operation of the electrodes.

The STT wave form for current $I_1$, $I_2$ is created by a series of individually controlled current pulses 220, 222, respectively. These pulses are created at high frequency, generally above about 20 kHz, with the magnitude of the current being dictated by a pulse width modulator having an input from an error amplifier. The error amplifier compares the actual welding current with the STT wave form to create a short circuit welding operation having a pulse shape or wave form as shown in FIG. 6. Of course, other welders can be used for individually and independently controlling the welding current of electrodes C1, C2. The invention involves side-by-side consumable electrodes impinging upon the diverging sidewall of open root joint 30 as the electrodes move along path P. Lateral adjustment of the spacing between the electrodes can be accomplished by a variety of mechanisms which moves one electrode laterally, another electrode laterally or both of the electrodes laterally as illustrated in the preferred embodiment. By rotating torch 50 around an axis which is generally vertical to gap g and between the electrodes the spacing of the electrodes is adjusted. The rotational axis, in practice, is generally perpendicular to the gap; however, it could be at a slight angle with the torch pointing forward to feed the electrodes in a forward direction toward sidewalls 14, 16. Other modifications and combinations of components can be made without departing from the present invention.

Having thus defined the invention, the following is claimed:

1. An electric welding apparatus comprising a first consumable electrode and a second consumable electrode movable mechanically in unison along a welding path in a movement direction defined by the gap between the edges of two adjacent, mutually grounded first and second plates, a first power supply for passing a first welding current between said first electrode and said first plate, a second power supply for passing a second welding current between said second electrode and said second plate and a torch for directing said first and second electrodes toward said first and second plates, respectively, from first and second driven wire feeders, respectively, whereby said first and second electrodes are spaced from each other in a direction transverse to said movement direction and an insulator structure in said torch to isolate said electrodes electrically as they move toward said plates wherein said first power supply is a short circuit welder creating a succession of welding cycles each having a short circuit portion and a plasma arc portion with the plasma arc portion including in sequence a plasma boost segment, a tailout segment and a background current segment.

2. An electric welding apparatus as defined in claim 1 wherein said welder is an STT welder.

3. An electric welding apparatus as defined in claim 2 including an adjusting mechanism to move said electrodes relative to each other.

4. An electric welding apparatus as defined in claim 3 wherein said adjusting mechanism moves both of said electrodes in unison.

5. An electric welding apparatus as defined in claim 4 wherein said adjusting mechanism includes means for rotating said torch around an axis generally vertical to said gap and between said electrodes.

6. An electric welding apparatus as defined in claim 5 wherein said axis is generally perpendicular to said gap.

7. An electric welding apparatus comprising a first consumable electrode and a second consumable electrode movable mechanically in unison along a welding path in a movement direction defined by the gap between the edges of two adjacent, mutually grounded first and second plates, a first power supply for passing a first welding current between said first electrode and said first plate, a second power supply for passing a second welding current between said second electrode and said second plate and a torch for directing said first and second electrodes toward said first and second plates, respectively, from first and second driven wire feeders, respectively, whereby said first and second electrodes are spaced from each other in a direction transverse to said movement direction and an insulator structure in said torch to isolate said electrodes electrically as they move toward said plates including an adjusting mechanism to move said electrodes relative to each other.

8. An electric welding apparatus as defined in claim 7 wherein said adjusting mechanism moves both of said electrodes in unison.

9. An electric welding apparatus as defined in claim 8 wherein said adjusting mechanism includes means for rotating said torch around an axis generally vertical to said gap and between said electrodes.

10. An electric welding apparatus as defined in claim 9 wherein said axis is generally perpendicular to said gap.

11. An electric welding apparatus comprising a first consumable electrode and a second consumable electrode movable mechanically in unison along a welding path in a movement direction defined by the gap between the edges of two adjacent, mutually grounded first and second plates, a first power supply for passing a first welding current between said first electrode and said first plate, a second power supply for passing a second welding current between said second electrode and said second plate and a torch for directing said first and second electrodes toward said first and second plates, respectively, from first and second driven wire feeders, respectively, whereby said first and second electrodes are spaced from each other in a direction transverse to said movement direction and an insulator structure in said torch to isolate said electrodes electrically as they move toward said plates wherein said first power supply is a surface tension transfer welder.

12. An electric welding apparatus as defined in claim 11 including an adjusting mechanism to move said electrodes relative to each other.

13. An electric welding apparatus as defined in claim 12 wherein said adjusting mechanism moves both of said electrodes in unison.

14. An electric welding apparatus comprising a first consumable electrode and a second consumable electrode movable mechanically in unison along a welding path in a movement direction defined by the gap between the edges of two adjacent, mutually grounded first and second plates, a first power supply for passing a first welding current between said first electrode and said first plate, a second power supply for passing a second welding current between said second electrode and said second plate and a torch for directing said first and second electrodes toward said first and second plates, respectively, from first and second driven wire feeders, respectively, whereby said first and second electrodes are spaced from each other in a direction transverse to said movement direction and an insulator structure in said torch to isolate said electrodes electrically as they move toward said plates wherein said first and second power supplies are both surface tension transfer welders.

15. An electric welding apparatus comprising a first consumable electrode and a second consumable electrode movable mechanically in unison along a welding path in a movement direction defined by the gap between the edges of two adjacent, mutually grounded first and second plates, a first power supply for passing a first welding current between said first electrode and said first plate, a second power supply for passing a second welding current between said second electrode and said second plate and a torch for directing said first and second electrodes toward said first and second plates, respectively, from first and second driven wire feeders, respectively, whereby said first and second electrodes are spaced from each other in a direction transverse to said movement direction and an insulator structure in said torch to isolate said electrodes electrically as they move toward said plates wherein said first and second power supplies are each short circuit welders for creating a succession of welding cycles each having a short circuit portion and a plasma arc portion with the plasma arc portion including in sequence a plasma boost segment, a tailout segment and a background current segment.

16. An electric welding apparatus as defined in claim 15 including an adjusting mechanism to move said electrodes relative to each other.

17. An electric welding apparatus as defined in claim 16 wherein said adjusting mechanism moves both of said electrodes in unison.

18. An electric welding apparatus as defined in claim 17 wherein said adjusting mechanism includes means for rotating said torch around an axis generally vertical to said gap and between said electrodes.

19. An electric welding apparatus as defined in claim 18 wherein said axis is generally perpendicular to said gap.

20. An electric welding apparatus as defined in claim 15 wherein said first and second power supplies are STT welders.

21. An electric welding apparatus as defined in claim 20 including an adjusting mechanism to move said electrodes relative to each other.

22. An electric welding apparatus as defined in claim 21 wherein said adjusting mechanism moves both of said electrodes in unison.

23. A method for welding the gap between two ends of adjacent first and second pipe sections, said method comprising:

(a) moving a first consumable electrode along the end of said first pipe section;

(b) moving a second consumable electrode along the end of said second pipe section;

(c) moving said electrodes in unison in side by side relationship on opposite sides of said gap;

(d) applying a first welding current to said first electrode; and, (e) applying a second welding current to said second electrode, separate from said first welding current, wherein said first and second welding currents create short circuit welding in a common weld puddle.

24. A method as defined in claim 23 wherein said first and second weld currents are created by separate STT welders.

* * * * *